United States Patent Office

3,494,965
Patented Feb. 10, 1970

3,494,965
2-METHYLENE-3-BUTENYL SULFONIUM MONOMERS
Giffin D. Jones, Gerald R. Geyer, and Melvin J. Hatch, Midland, Mich., assignors to The Dow Chemical Company, Midland, Mich., a corporation of Delaware
No Drawing. Original application July 9, 1964, Ser. No. 381,546. Divided and this application Dec. 28, 1967, Ser. No. 709,522
Int. Cl. C07c *149/16;* C08f *3/84;* D21h *3/36*
U.S. Cl. 260—607                           6 Claims

ABSTRACT OF THE DISCLOSURE

Cationic sulfonium monomers of the formula $$CH_2\overset{+}{S}R_4R_5X^-$$
$$|$$
$$CH_2=C-CH=CH_2$$

are prepared by reaction of 2-halomethyl-1,3-butadiene with an organic sulfide $R_4SR_5$. These sulfonium monomers can be polymerized to form cationic polymers useful in paper coatings.

---

This application is a division of application Ser. No. 381,546 filed July 9, 1964.

These new and useful cationic products are preferably prepared from 2-chloromethyl-1,3-butadiene, although the corresponding bromomethyl derivative can also be used, by reaction of 2-chloromethyl-1,3-butadiene or a polymer thereof with an appropriate reagent to substitute for the reactive chloro group a functional sulfonium group. It has further been discovered that useful polymers can also be obtained by polymerization of the cationic monomers.

The novel cationic monomers described herein are soluble in such polar hydroxylic solvents as water, lower alcohols, or ethylene glycol. The cationic monomers are of interest as insecticides or fungicides. Because of the 1,3-diene structure, these monomers can be polymerized alone or with other polymerizable ethylenically unsaturated monomers. By virtue of the cationic substituents, the monomers are useful copolymer components to improve the dye receptivity or to increase the water solubility and hydrophilic properties of polymers otherwise deficient in these properties.

By appropriate choice of the functional cationic group, soluble polymers with varied chemical and physical properties desired for flocculants, dispersants, or thickeners can be obtained. Particularly useful are water-soluble cationic polymers which can be used without the hazards of flammability, toxicity and volatility often associated with organic solvent systems. Such cationic polymers are particularly advantageous as electroconductive or wet-strength additives for paper and other cellulosic products.

The properties of these new cationic polymers are dependent both on the specific functional moieties and on the backbone polymer matrix. The presence of residual unsaturation in the polymer provides ready sites for subsequent modification of the polymer. For example, the cationic polymer applied as a paper coating can be further polymerized or cross-linked to decrease the water sensitivity of the coating. Alternatively the unsaturation offers potential sites for oxidative or biological degradation of the polymer if only temporary utility is desired.

(I) CATIONIC 1,3-BUTADIENE MONOMERS 2-chloromethyl-1,3-butadiene is conveniently prepared by the chlorination of isoprene as described by Berenbaum in U.S. Patent 2,937,125. The chloro group is activated and can be replaced by reaction with suitable organic amines and sulfides to give the desired cationic monomers. Suitable amines and sulfides are those which (1) react with a stoichiometric amount of benzyl chloride to displace at least 5 mole percent of the chloride therefrom in 48 hours at 20°–100° C., and (2) are soluble to the extent of at least 5 wt. percent in a polar hydroxylic solvent such as water or a $C_1$–$C_8$ mono- or polyhydric alcohol at 25° C.

(A) Amino and ammonium monomers

Particularly useful monomers are the water-soluble strongly basic quaternary ammonium derivatives obtained by amination of 2-chloromethyl-1,3-butadiene with tertiary amines. However, amination can also be achieved with ammonia, primary and secondary amines, alkyleneimines and alkylene polyamines. While lower alkyl and hydroxyalkyl amines are desirable to achieve maximum water solubility, other alkyl, cycloalkyl and aromatic amines can be used.

More specifically new and useful cationic monomers are obtained by amination of 2-chloromethyl-1,3-butadiene with:

(1) Amines of the formula:

$$NR_1R_2R_3$$

wherein $R_1$ is a member of the group consisting of hydrogen, $C_2$–$C_4$ mono- and dihydroxyalkyl groups, and $C_1$–$C_{16}$ alkyl, cycloalkyl, aryl, and aralkyl groups; and
$R_2$ and $R_3$ individually are members of the group consisting of hydrogen, $C_1$–$C_4$ alkyl groups, and $C_2$–$C_4$ mono- and dihydroxyalkyl groups;

(2) Alkylenepolyamines of the general formula:

$$NH_2(C_aH_{2a}NH)_bH$$

wherein $a$ is an integer from 2 to 6 inclusive and $b$ is an integer from 1 to 4 inclusive;

(3) Heterocyclic amines such as ethylenimine, morpholine, piperidine, pyridine, pyrrolidine, and $C_1$–$C_4$ alkyl derivatives thereof.

Typical of the tertiary amines which are particularly desirable in the preparation of valuable cationic derivatives are trimethylamine, tri-n-butylamine, dimethylaminoethanol, dimethylisopropanolamine, dimethylbenzylamine, dimethylaniline, dimethylcyclohexylamine, N,N-dimethylamino-1,2-propanediol, methyldiethanolamine, and dimethyldodecylamine, as well as such tertiary heterocyclic amines as pyridine, 2,4-lutidine and N-methylmorpholine. Representative of the variety of primary and secondary amines which can be used are methylamine, diisopropylamine, methylethanolamine, N-methylaniline, piperidine, 2,5 - dimethylpiperazine, 2 - aminoethanol, isopropanolamine, and such alkylenepolyamines as ethylenediamine, propylenediamine, 1,6-diaminohexane, diethylenetriamine, etc. Mixtures of two or more amines can also be used.

In practice, amination is generally effectively and conveniently achieved by adding an aqueous solution of the desired tertiary amine to an alcoholic solution of 2-chloromethyl-1,3-butadiene. Alternately the reaction can be carried out in an anhydrous polar solvent such as methanol or a liquid solvent in which both the chloromethylbutadiene and tertiary amine are soluble such as toluene or methylene chloride. Usually a 10 to 25 percent excess of amine is adequate to achieve high yields of the quaternary ammonium monomer with a reaction temperature between about 0 to 60° C. and preferably between 20 and 50° C. A reaction time of from a few minutes to several hours is generally adequate although a longer time may be required with less reactive amines.

When an aqueous solution of amine is employed, the soluble cationic monomer is usually dissolved in the aqueous phase. Often this aqueous solution can be directly used. However, when necessary, the cationic monomer can be isolated by removal of the solvent, by precipitation as an insoluble salt, or by other conventional means.

(B) Sulfonium monomers

Still other cationic monomers can be prepared by reacting the 2-chloromethyl-1,3-butadiene with an organic sulfide. Particularly desirable are the sulfonium derivatives prepared from sulfides of the general formula:

$$SR_4R_5$$

wherein $R_4$ is a member of the group consisting of $C_1$–$C_6$ alkyl, $C_2$–$C_4$ monohydroxyalkyl, and $C_7$–$C_{12}$ aralkyl groups; and $R_5$ is a member of the group consisting of (1) $C_1$–$C_6$ alkyl and $C_2$–$C_4$ monohydroxy alkyl groups, and (2) —$C_mH_{2m}$COOQ wherein $m$ is an integer from 1 to 4 inclusive and Q is hydrogen, a $C_1$–$C_6$ alkyl group, or a monovalent cation.

Typical organic sulfides which may be employed are dimethylsulfide, n-butylmethylsulfide, 2-(methylmercapto)ethanol, bis-(2-hydroxyethyl) sulfide, and methyl 3-methylthiopropionate. Generally, it is preferable to use an organic sulfide wherein one of the substituent groups contains not more than 2 carbon atoms.

Although the reaction of 2-chloromethyl-1,3-butadiene with an organic sulfide is not as rapid as amination, it can be carried out under similar conditions preferably using water, alcohol, ethylene glycol or a similar solvent as a diluent and a reaction temperature between about 20° and 60° C. A reaction time of from 2 to 20 hours or more is often required for complete reaction. With a low boiling solvent or reactant, it may be necessary to use a moderate elevated pressure.

The quaternary ammonium or sulfonium monomers prepared from 2-chloromethyl-1,3-butadiene have normally a chloride counteranion. However, if desired, the chloride anion can be replaced by standard ion exchange techniques with other common anions such as sulfate, bisulfate, nitrate, carbonate, acetate, citrate, etc. However, for most purposes the chloride salt is usually preferred.

(C) Polymerization

By virtue of the 1,3-diene structure, the amino, ammonium and sulfonium monomers described herein are susceptible to polymerization alone or with other polymerizable ethylenically unsaturated monomers. The polymers range from viscous liquids to white solids depending on factors such as the molecular weight. The composition of copolymers can be varied widely. The amount of cationic monomer required to modify the properties of a polymer is often small. For instance, about 0.5 mole percent of trimethyl(2-methylene-3-butenyl) ammonium chloride copolymerized with a hydrophobic monomer such as styrene provides a copolymer having an appreciable increase in hydrophilic properties. Indeed these cationic 1,3-butadiene monomers are particularly effectively employed in minor proportions ranging from about 0.5 to 20 mole percent based on total monomer to incorporate a moderate number of functional cationic groups in a copolymer.

Among the many known polymerizable ethylenically unsaturated compounds which can be copolymerized with the cationic monomers described herein are vinylaromatic compounds such as styrene, vinyltoluene, divinylbenzene, chlorostyrene and methylstyrene; ethylenic monomers such as vinyl chloride, allyl chloride, acrylonitrile, acrylamide, vinyl ethers and vinyl ketones; other dienes such as 1,3-butadiene, isoprene, chloroprene, and 2-chloromethyl-1,3-butadiene; and other similar compounds containing one or more ethylenic linkages capable of addition polymerization. Combinations of more than two monomers may be used if desired.

These cationic 1,3-butadiene monomers are quite reactive monomers. Polymers and copolymers can be prepared in bulk, in solution or in dispersion using conventional techniques. Polymerization is accelerated by the addition of conventional vinyl polymerization catalysts such as sodium persulfate, hydrogen peroxide, benzoyl peroxide, tertiary butyl peroxide, and $\alpha,\alpha'$-azobisisobutyronitrile. Usually such catalysts are employed in an amount ranging from about 0.1 to 2 weight percent based on total monomer. With a suitable catalyst polymerization is readily achieved at temperatures ranging from about 0° to 100° C.

(II) CATIONIC DERIVATIVES OF 2-CHLOROMETHYL-1,3-BUTADIENE POLYMERS

An alternate and complementary approach to the synthesis of valuable cationic polymers containing moieties of the formula:

$$\left[-CH_2-\underset{\underset{CH_2Z}{|}}{C}=CH-CH_2-\right]- \qquad \text{II}$$

wherein Z is a functional amino, ammonium or sulfonium group, entails an initial polymerization or copolymerization of 2-chloromethyl-1,3-butadiene and subsequent replacement of the activated chlorine with the desired functional cationic group by reaction of the substituent chloromethyl groups with organic amines, sulfides, and other similar nucleophilic reagents to form cationic substituents of the formula:

$$—CH_2Z$$

By appropriate choice of reactants, soluble cationic derivatives with a wide range of functional groups can be prepared. With a low molecular weight, water-soluble amine or sulfide, water-soluble ammonium or sulfonium derivatives can be prepared, the resulting polymers being dispersible in water to provide a visually homogeneous and substantially transparent solution infinitely dilutable with water. With less hydrophilic reagents, such as dimethyldodecylamine, the water solubility of the cationic derivatives decreases with a concurrent increase in solubility in less polar solvents such as isopropyl alcohol.

The prerequisite intermediate polymer required for this alternative synthesis of the cationic 1,3-butadiene polymers can be prepared from 2-chloromethyl-1,3-butadiene by homopolymerization or copolymerization with many known ethylenically unsaturated compounds. Typical of suitable comonomers are other dienes like isoprene, 1,3-butadiene, chloroprene and 1-chloro-2-methyl-1,3-butadiene; vinylaromatics such as styrene and vinyltoluene; ethylenically unsaturated acids and derivatives thereof such as acrylic and methacrylic acid, their salts, esters, nitriles and amides; and other ethylenic monomers like vinyl chloride, allyl chloride, acrylonitrile, and vinyl ethers. While the amount of 2-chloromethyl-1,3-butadiene in the comonomer mixture can be as low as 0.5 mole percent, this approach to the synthesis of cationic polymers is most advantageous when 10–20 mole percent or more of 2-chloromethyl-1,3-butadiene is used. To obtain maximum cationic capacity, a homopolymer of 2-chloromethyl-1,3-butadiene is used.

Polymerization of 2-chloromethyl-1,3-butadiene is achieved by conventional means, preferably in aqueous emulsion. It is accelerated by heat and catalyzed by conventional free radical catalysts such as $\alpha,\alpha$-azobisisobutyronitrile, potassium persulfate, benzyl peroxide and hydrogen peroxide. While optimum polymerization conditions will depend on the particular monomer and catalyst system being used, it is generally beneficial to carry out the polymerization between about 50° and 100° C. with a reaction time of from 2 to 50 hours or more to achieve high conversions.

The resulting polymer can be isolated and purified by standard methods. For example, the homopolymer can be precipitated from aqueous emulsion with methanol. The essentially linear polymer is insoluble in water, methanol, dioxane and similar polar solvents, but easily dissolves in such non-polar solvents as methylene chloride, carbon tetrachloride and toluene. Structural studies indicate that the homopolymer is largely a 1,4-addition polymer i.e., that the predominate structural moiety has the formula:

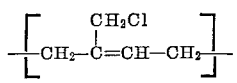

However, there is some evidence for minor amounts of 1,2-addition polymerization. As estimated from osmotic pressure measurements, the homo- and copolymer molecular weight can range from about 10,000 to 100,000.

(A) Amino and ammonium derivatives

Particularly desirable are water-soluble, strongly basic quaternary ammonium derivatives obtained by amination of the soluble 2-chloromethyl-1,3-butadiene polymer with tertiary amines. However, amination can also be achieved with ammonia, primary and secondary amines, alkylenimines and alkylene polyamines. In general, the amines disclosed above as suitable for the preparation of new monomeric compounds can also be employed for amination of the polymeric 2-chloromethyl-1,3-butadiene. Most suitable are amines containing less than 10 carbon atoms and free of substituents other than hydroxyl or ether groups.

In practice amination is often conveniently and effectively achieved by treating a crude polymer of 2-chloromethyl-1,3-butadiene in solution or suspension with an aqueous solution of the desired amine. Alternately the solid intermediate polymer can be isolated and then aminated with an anhydrous amine usually in the presence of a solvent which dissolves both the amine and polymer such as toluene or methylene chloride. With tertiary amines a 10–25 percent excess of amine based on the chloromethyl content of the intermediate polymer is usually adequate for rapid and essentially complete amination. However, to minimize cross-linking with primary and polybasic amines, a larger excess is generally advantageous. Amination of the intermediate polymer usually proceeds readily at a temperature between about 0° and 60° C. A reaction time ranging from a few minutes to several hours at 20° to 50° C. generally gives high yields although a longer time may be required with less reactive amines.

By using an aqueous process system, the amino or ammonium polymer can generally be obtained as an aqueous solution which may be often used for many applications without further processing. When necessary, however, the cationic polymer can be isolated and purified by precipitation with an appropriate diluent, removal of the solvent, and other conventional means.

(B) Sulfonium derivatives

Still other cationic derivatives can be prepared by reacting the soluble intermediate 2-chloromethyl-1,3-butadiene with an organic sulfide. Particularly desirable are the sulfonium derivatives prepared from such sulfides as dimethylsulfide, n-butylmethylsulfide, 2-(methylmercapto) ethanol, bis-(2-hydroxyethyl) sulfide and methyl 3-methylthiopropionate. Other organic sulfides disclosed above as suitable for the preparation of new sulfonium monomers can also be used. Again it generally is preferable to use an organic sulfide wherein one of the substituent groups contains not more than 2 carbon atoms.

Although the reaction of the intermediate polymer with an organic sulfide is not as rapid as amination, it can be carried out under similar conditions using a suitable diluent and a reaction temperature between about 20° and 60° C. A reaction time of from 2 to 20 hours or more is often required for complete reaction. With a low boiling solvent or reactant, it may be necessary to use a moderate elevated pressure.

Within the general scope of this invention, optimum conditions for a particular monomeric or polymeric product can be determined in a routine manner. Also these cationic products prepared by reaction of an activated halomethyl group and preferably a chloromethyl group normally have a halide counter anion. When desired, the halide anion can be replaced, using standard ion exchange techniques, with other common anions such as sulfate, bisulfate, nitrate, hydroxide, carbonate, acetate, etc. With non-quaternary ammonium derivatives, polymers having free amino groups are obtained by treatment with an appropriate base.

Furthermore by proper choice of reagents, mole ratios, and reaction conditions, it is possible to prepare derivatives containing more than one type of cationic group. For example, the properties of quaternary ammonium and sulfonium derivatives can be combined in the same product.

In summary, it has been discovered that new and useful cationic monomers and soluble functional cationic polymers can be prepared from 2-chloromethyl-1,3-butadiene. Because of the variety of functional cationic groups which can be bonded to the butadiene polymer matrix through the 2-methylene group, derivatives can be obtained with a wide range of properties. The water-soluble cationic polymers are useful as flocculants in aqueous mineral and sewage systems, as additives to increase the strength or electroconductivity of paper, while water-insoluble polymers are particularly useful as extractants in removing anions from aqueous process streams.

To illustrate further the invention described herein, the following examples are given. Unless otherwise specified, all parts and percentages are by weight.

EXAMPLE 1

Quaternary ammonium monomers 2-chloromethyl-1,3-butadiene was obtained by fractional distillation of chlorinated isoprene. A mixture, B.P. 76–78° C./300 mm., contained by vapor phase chromatographic analysis 80% 2-chloromethyl-1,3-butadiene with 20% cis- and trans-1-chloro-2-methyl-1,3-butadiene and isoprene hydrochlorides. By further fractionation, 2-chloro-1,3-butadiene with a minimum purity of about 95% was obtained.

(A) To a solution of 29.5 parts (0.29 mole) of 96.7% 2-chloro-1,3-butadiene in 80 parts of absolute ethanol was added at room temperature 70 parts (1.2 moles) of trimethylamine in 160 parts of ethanol. After reacting for 2 hours at room temperature, the solvent and excess amine were stripped from the product in vacuo to give 37.3 parts (80 percent yield) of a hydroscopic white crystalline solid which readily dissolved in water.

The infrared spectrum and elemental analysis of the product were consistent with the structure:

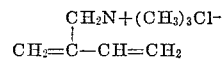

i.e., trimethyl (2-methylene-3-butenyl) ammonium chloride. The ultraviolet spectrum of a dilute aqueous alcohol solution showed a peak at 220 mμ characteristic of a 1,3-diene with an extinction coefficient of about 28,000 cm.²/mole. From analysis of the nuclear magnetic resonance (NMR) spectrum in D₂O solution, the monomer contained less than 5 percent dimer.

(B) To a solution of 10 parts (0.10 mole) of 87% 2-chloromethyl-1,3-butadiene in 40 parts of absolute ethanol was added 15.7 parts (0.10 mole) of octyldimethylamine in 70 parts of ethanol. The mixture was shaken for 6 hours at 25° C. and then concentrated in vacuo. The NMR spectrum and ionic chloride content of the resulting hydroscopic residue are consistent with the presence of octyldimethyl (2-methylene-3-butenyl) ammonium chloride.

EXAMPLE 2

Quaternary ammonium polymers (A) A mixture of 31.4 parts of the quaternary trimethylammonium monomer described in Example 1A, 7.5 parts of water, and 3 parts of a 5% solution of disodium ethylenediaminetetraacetate was adjusted to pH 5 and de-aerated. Then 0.74 part of a 10% aqueous solution of t-butylhydroperoxide was added and the mixture heated for 16 hours at 60° C. The resulting trimethylammonium polymer (TMA-2) had a viscosity of 1.30 cps. as a 5% solution in dilute (4%) sodium chloride at pH 5 and 25° C. No monomer was evident in the NMR spectrum. As shown below (Example 8) this quaternary ammonium polymer is an effective electroconductive additive for paper.

(B) Using a 50% aqueous solution of the trimethylammonium monomer and $X_2S_2O_8$ as a catalyst, a soluble cationic polymer was obtained having a 5% solution viscosity of 1.51 cps. Other cationic ammonium monomers are polymerized in like manner to obtain soluble, substantially linear polymers useful as flocculants, dispersants and additives for many other applications where the functional cationic nature of the polymer provides enhanced properties.

EXAMPLE 3

Sulfonium monomers (A) A mixture of 40 parts methanol, 21 parts (0.21 mole) 2-chloromethyl-1,3-butadiene, and 34 parts (0.55 mole) of dimethylsulfide was stirred at room temperature for about 22 hours. Dilution with water gave a dark, 2-phase mixture which was extracted with methylene chloride to remove unreacted material. Titration of the aqueous phase containing the sulfonium chloride titrated for chloride and total acidity, indicated a 57% yield of the desired sulfonium chloride. The ultraviolet spectrum of a dilute aqueous solution of the sulfonium chloride had a maximum of 220 m$\mu$ with an extinction coefficient of 12,000 cm.$^2$/mole.

Treatment of a portion of the aqueous product solution with excess lithium picrate gave a deep yellow precipitate of a sulfonium picrate. The molecular weight of a sample of the picrate salt purified by recrystallization from methanol was determined by potentiometric titration in glacial acetic acid with perchloric acid. Calcd. MW, 357; found, 359 and 364. A sample of pure dimethyl (2-methylene-3-butenyl) sulfonium chloride was prepared by passing a dilute solution of the sulfonium picrate through a column of strong base anion exchange resin in the chloride form. The ultraviolet, infrared and NMR spectra of the chloride were consistent with the assigned structure.

(B) A mixture of 50 parts of 2-chloromethyl-1,3-butadiene (88% pure), 74 parts of thiodiglycol and 5 parts of water was stirred at 55° C. for 6 hours giving a thick emulsion. On cooling the phases separated and 116 parts of an aqueous phase, 10.3 parts of an oil layer and 3.8 parts of an insoluble polymer were recovered. The aqueous phase was diluted with water to give a 34% solution of bis(2-hydroxyethyl-2-methylene-3-butenyl) sulfonium chloride. The spectra of the product solution were consistent with this structure. On standing for a period of several weeks at room temperature, the aqueous monomer solution slowly thickened.

EXAMPLE 4

Acrylamide-sulfonium copolymer

A solution of 5 parts acrylamide and 1.9 parts of dimethyl-2-methylene-3-butenyl sulfonium chloride in 15 parts of water was purged with nitrogen and allowed to stand 4 days in a sealed vial. The mixture became noticeably viscous within a few hours and was very syrupy after 4 days. It was then diluted further with water.

The cationic nature of the acrylamide polymer was indicated by conservation when a sample of the aqueous product solution was added to a solution of sulfonated polyvinyltoluene. When tested as a beater additive, this acrylamide copolymer was effective in improving the wet strength of paper.

EXAMPLE 5

Poly(2-chloromethyl-1,3-butadiene) intermediate

An aqueous emulsion was prepared by vigorously agitating a mixture of 260 parts of 80 percent 2-chloromethyl-1,3-butadiene, 0.12 part of tert.-dodecylmercaptan, and an aqueous solution of 1.4 parts of sodium lauryl sulfate, 0.3 part of potassium persulfate and 0.3 part of sodium bicarbonate in 140 parts of water. Polymerization was achieved by heating the emulsion at about 50° C. for 40 hours. Then the polymer was precipitated by pouring the emulsion into an excess of methanol with vigorous agitation. The finely divided, white product was recovered by filtration, washed with methanol and then air dried.

The poly (2-chloromethyl-1,3-butadiene) was insoluble in water and methanol, but dissolved in methylene chloride, toluene and tetrahydrofuran. It contained 30.3 wt. percent side chain chlorine as determined by reaction with excess trimethylamine and 31.5 wt. percent total chlorine by elemental analysis. The higher total chlorine indicates copolymerization of some 1-chloro-2-methyl-1,3-butadiene The polymer had an average molecular weight of 35,000 as determined by the membrane osmotic pressure of a tetrahydrofuran solution. Spectral studies indicate that the polymer has predominately the 1,4-addition structure.

Other polymers and copolymers containing polymerized 2-chloromethyl-1,3-butadiene are prepared in a similar manner.

EXAMPLE 6

Ammonium derivatives (A) To about 250 parts of an isolated poly (2-chloromethyl-1,3-butadiene) containing 30.3 wt. percent side chain chlorine was added 720 parts of 25 wt. percent aqueous trimethylamine (30 percent excess) and the mixture was agitated at room temperature until the polymer completely dissolved. The resulting quaternary ammonium derivative was precipitated by pouring the aqueous solution into an excess of acetone with vigorous stirring. A sample of the hydroscopic cationic polymer, purified by reprecipitation from aqueous solution contained 19.2 wt. percent ionic chloride indicating a purity of about 90 percent as the quaternary trimethylammonium derivative (TMA-6).

(B) In a similar manner, other quaternary ammonium and ammonium polymers are prepared by reaction of 2-chloromethyl-1,3-butadiene polymers with other amines such as dimethyldodecylamine, dimethylaminoethanol, pyridine and diethylenetriamine using sufficient excess amine to minimize cross-linking. The dimethyldodecylamine derivative was insoluble in water, but soluble in methanol, isopropanol, and 50 percent aqueous isopropanol.

EXAMPLE 7

Sulfonium derivatives

To 100 parts of a 2-chloromethyl-1,3-butadiene polymer prepared in a manner similar to that described in Example 1, was added an aqueous solution of 150 parts of thiodiglycol (40 percent excess). The mixture was shaken at room temperature until the polymer dissolved. Since the sulfonium polymer had a tendency to decompose when isolated, it was stored and used as 10–20 wt. percent aqueous solution. A sample precipitated from solution with acetone was found to contain 50.08 percent C, 7.78 percent H, 5.40 percent Cl, 18.75 percent S and 16.95 percent O indicating a purity of about 75–80 percent with excess thiodiglycol as an impurity.

EXAMPLE 8

Electroconductive additives

The quaternary ammonium polymers described in Examples 1 and 6 are effective electroconductive additives for paper. In tests made according to the general method described in ASTM D–257–61, standard test sheets of 51 lb. bleached sulfite paper were dipped in an aqueous solution of the quaternary ammonium polymers until a 5–15 wt. percent polymer pickup was obtained. The treated sheets were dried for 5 minutes at about 110° C, weighed, and cut into standard test strips. The strips were conditioned at room temperature and the desired relative humidity (70 RH) for 24 hours. Then the electroconductivity was measured using strips treated with a commercial quaternary ammonium electroconductive resin as a control standard.

Typical results given in Table 1 compare the effectiveness of the polymerized trimethyl(2-methylene-3-butenyl) ammonium chloride (TMA–2) and the trimethylamine derivative of poly (2-chloromethyl-1,3-butadiene) (TMA–6) with the commercial additive in both surface and volume resistivity.

TABLE 1.—ELECTROCENDUCTIVE ADDITIVES
[A. Surface Resistivity]

| Additive | Wt. Percent | Surface Resistivity, ohms | | |
|---|---|---|---|---|
| | | 7–108 RH | 30–33% RH | 56–608 RH |
| Commercial | 7.0 | 2.6×10⁹ | 3.5×10⁸ | 1.8×10⁷ |
| TMA–1 | 10.0 | 4.4×10¹¹ | 2.8×10⁸ | 1.1×10⁷ |
| TMA–6 | 8.0 | | 3.4×10¹⁰ | |

[B. Volume Resistivity]

| Additive | Wt. Percent | Volume Resistivity, ohms | | |
|---|---|---|---|---|
| | | 7% RH | 30–33% RH | 60% RH |
| Commercial | 7.0 | 1.2×10¹³ | 8.1×10¹¹ | 5.7×10⁹ |
| TMA–1 | 8.2 | 1.9×10¹³ | 4.0×10¹¹ | 2.9×10⁹ |
| TMA–6 | 16 | | 4.8×10⁹ | 1.8×10⁷ |

EXAMPLE 9

Flocculants

The water-soluble ammonium polymers are active as flocculants for a variety of aqueous slurries. Typical data from tests with the quaternary trimethylammonium polymer (TMA–6) described in Example 6 are given in Table 2. In these tests a known amount of dilute aqueous polymer solution was added to a well dispersed aqueous suspension of finely divided mineral ore in a graduated cylindrical tube. The settling rates of the treated slurries were determined in the usual manner. At the end of the sedimentation period, the clarity of the supernatant liquid was measured with an optical turbidimeter calibrated with standard silicon dioxide suspensions. The clarity of the overhead supernatant liquid was recorded in terms of an equivalent silicon dioxide content (p.p.m. $SiO_2$).

TABLE 2.—FLOCCULATION TESTS
[Trimethylamine Derivative of poly(2-chloromethyl-1,3-butadiene)]

| Slurry | Polymer added, p.p.m. | Settling rate, in. min. | Overhead clarity, p.p.m. $SiO_2$ |
|---|---|---|---|
| Quebec Cartier Taconite, 0.9% solids | 1 | 7.58 | 180 |
| | 2 | 9.69 | 75 |
| | 3 | 8.72 | 41 |
| Erie Mining Taconite Tailings, 13% solids | None | 0.304 | 928 |
| | 1.5 | 0.680 | 992 |
| | 2.5 | 0.881 | 640 |
| | 3.5 | 0.958 | 368 |
| Arcturus Tailings, 6% solids | 2.5 | 0.88 | 176 |
| | 5.0 | 1.70 | 96 |
| | 10.0 | 2.98 | 39 |

EXAMPLE 10

Paper strength additives

The effectiveness of the sulfonium polymers in increasing wet and dry strength properties of paper was examined using an unbleached hardwood soda pulp beaten to about 400 CSF. The sulfonium polymers were incorporated at the desired loading as beater additives. Then handsheets were formed and dried in an Elmes laboratory hot press for 4 minutes with the top platen held at about 115° C. The sheets were conditioned in the test room and cut in a standard manner to provide the test specimens.

Typical test results using the thiodigylcol derivative described in Eaxample 7 as an additive are given in Table 3. It is evident that this additive enhances the wet and dry strength of the paper. At the same time it showed very little effect on the paper sizing.

Other sulfonium polymers prepared from the sulfonium monomers (Example 2) or by reaction of poly(2-chloromethyl - 1,3 - butadiene) with such sulfides as dimethyl sulfide and methylnonyl sulfide by the process described in Example 7 also enhance the wet and dry strength of paper.

TABLE 3.—BEATER ADDITIVE

| Wt. percent sulfonium polymer | Final pH | Tensile Strength | | Burst Strength | |
|---|---|---|---|---|---|
| | | Dry (Percent increase) | Wet (Percent of dry) | Dry (Percent increase) | Wet (Percent of dry) |
| None (control) | 5.9 | | 1.0 | | 3.0 |
| 0.5 | 6.1 | 28.6 | 17.3 | 38.7 | 27.9 |
| 1.0 | 6.4 | 34.6 | 18.1 | 47.3 | 25.8 |
| 2.0 | 6.5 | 26.5 | 19.6 | 46.6 | 26.5 |
| None (control) | 8.9 | | 9.8 | | 10.2 |
| 1.0 | 8.8 | 22.0 | 22.4 | 49.9 | 28.3 |

EXAMPLE 11

Reactivity of organic amines and sulfides

To demonstrate the reactivity of amines and sulfides which can be used to prepare the cationic products of this invention, the following procedure was used. About 2.5–3.0 mmoles of amine or sulfide was added to 0.25 parts (2.2 mmoles) of benzyl chloride in 25 parts of 65% aqueous ethanol. The mixture was agitated for a given time, usually about 16 hrs. at room temperature (R.T.), acidified and titrated potentiometrically for ionic chloride. A blank was run concurrently to correct for reaction with the solvent which was usually less than about 5%.

The reactivity of a number of typical amines and sulfides determined in the general manner described is shown in Table 4. Suitable amines and sulfides are those which react with a stoichiometric amount of benzyl chloride to displace at least 5 mole percent of the chloride therefrom in 48 hrs. at 20°–100° C. and are soluble to the extent of at least 5 wt. percent in a polar hydroxylic solvent such as water, aqueous ethanol or aqueous glycol.

TABLE 4.—REACTIVITY OF AMINES AND SULFIDES WITH BENZYL CHLORIDE

| Reactant | Conditions | Percent reaction |
|---|---|---|
| Ammonia | 16 hours; r. t. | 6 |
| Trimethylamine | do | 100 |
| Pyridine | do | 100 |
| Dimethylamine | do | 97 |
| Dimethylaminoethanol | do | 95 |
| Dodecylamine | 18 hours; r.t. | 100 |
| Dimethyldodecylamine | do | 86 |
| Dimethyl sulfide | 6 hrs; 35° C | 10 |
| Bis(2-hydroxyethyl) sulfide | 2 hours; 60–75° C | 90 |

We claim:

1. A cationic monomer of the general formula:

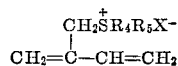

where $R_4$ is a member of the group consisting of $C_1$–$C_6$ alkyl, $C_2$–$C_4$ monohydroxyalkyl, and $C_7$–$C_{12}$ aralkyl groups;

$R_5$ is a member of the group consisting of $C_1$–$C_6$ alkyl and $C_2$–$C_4$ monohydroxyalkyl groups.

2. The cationic monomer of claim 1 wherein $R_4$ and $R_5$ are 2-hydroxyethyl groups.

3. The cationic monomer of claim 1 wherein $R_4$ and $R_5$ are methyl groups.

4. The cationic monomer of claim 1 where $R_4$ and $R_5$ individually are $C_1$–$C_6$ alkyl or $C_2$–$C_4$ monohydroxyalkyl groups.

5. Dimethyl(2-methylene-3-butenyl)sulfonium chloride.

6. Bis-2-hydroxyethyl(2-methylene-3-butenyl)sulfonium chloride.

References Cited

UNITED STATES PATENTS

| 2,111,260 | 3/1938 | Brunner | 260—607 XR |
| 2,252,081 | 8/1941 | Lieber | 260—607 |
| 3,047,631 | 7/1962 | Rocklin | 260—607 |

CHARLES B. PARKER, Primary Examiner

D. R. PHILLIPS, Assistant Examiner

U.S. Cl. X.R.

117—154; 162—82, 90, 72; 260—79.3, 83.7, 82.1, 82.3, 239, 247, 268, 290, 293, 315, 326.5, 481, 526, 567.6, 576, 583, 584, 853, 942